United States Patent

Orizand

[11] Patent Number: 5,914,038
[45] Date of Patent: Jun. 22, 1999

[54] SEPARATING DEVICE

[75] Inventor: Alexander Herman Orizand, Bilthoven, Netherlands

[73] Assignee: Pannevis B.V., Utrech, Netherlands

[21] Appl. No.: 08/961,391

[22] Filed: Oct. 30, 1997

[30] Foreign Application Priority Data

Oct. 30, 1996 [NL] Netherlands ............................ 1004385

[51] Int. Cl.⁶ .......................... B01D 33/056; B01D 33/04
[52] U.S. Cl. .......................... 210/401; 210/406; 210/783; 210/188; 210/400
[58] Field of Search ................................... 210/400, 401, 210/406, 783, 188

[56] References Cited

U.S. PATENT DOCUMENTS

| | | |
|---|---|---|
| 4,351,726 | 9/1982 | Somerville ............................... 210/401 |
| 4,569,762 | 2/1986 | Gaudfrin .................................. 210/401 |
| 5,308,487 | 5/1994 | Thissen . | 
| 5,443,725 | 8/1995 | Thissen . |
| 5,665,225 | 9/1997 | Prinssen . |

FOREIGN PATENT DOCUMENTS

| | | |
|---|---|---|
| 0304968 | 3/1989 | European Pat. Off. . |
| 0601627 | 6/1994 | European Pat. Off. . |
| 2540397 | 8/1984 | France . |
| 1-207109 | 8/1989 | Japan . |
| 8303016 | 3/1985 | Netherlands . |

*Primary Examiner*—Thomas M. Lithgow
*Attorney, Agent, or Firm*—Webb Ziesenheim, Bruening Logs, don Orkin & Hanson, P.C.

[57] ABSTRACT

A separating device comprises an endless carrier belt which supports a filter belt. Suction boxes for drawing off filtrate are placed on the side of the carrier belt. The carrier belt protrudes laterally into the continuous slot of the vacuum box. In a large separating installation with long carrier belts and filter belts lateral displacements of the carrier belt occur during operation, whereby sealing becomes a problem. These problems are resolved according to the invention in that the suction box has a sealing member connecting onto the side edge of the carrier belt and this sealing member is displaceable laterally.

12 Claims, 4 Drawing Sheets

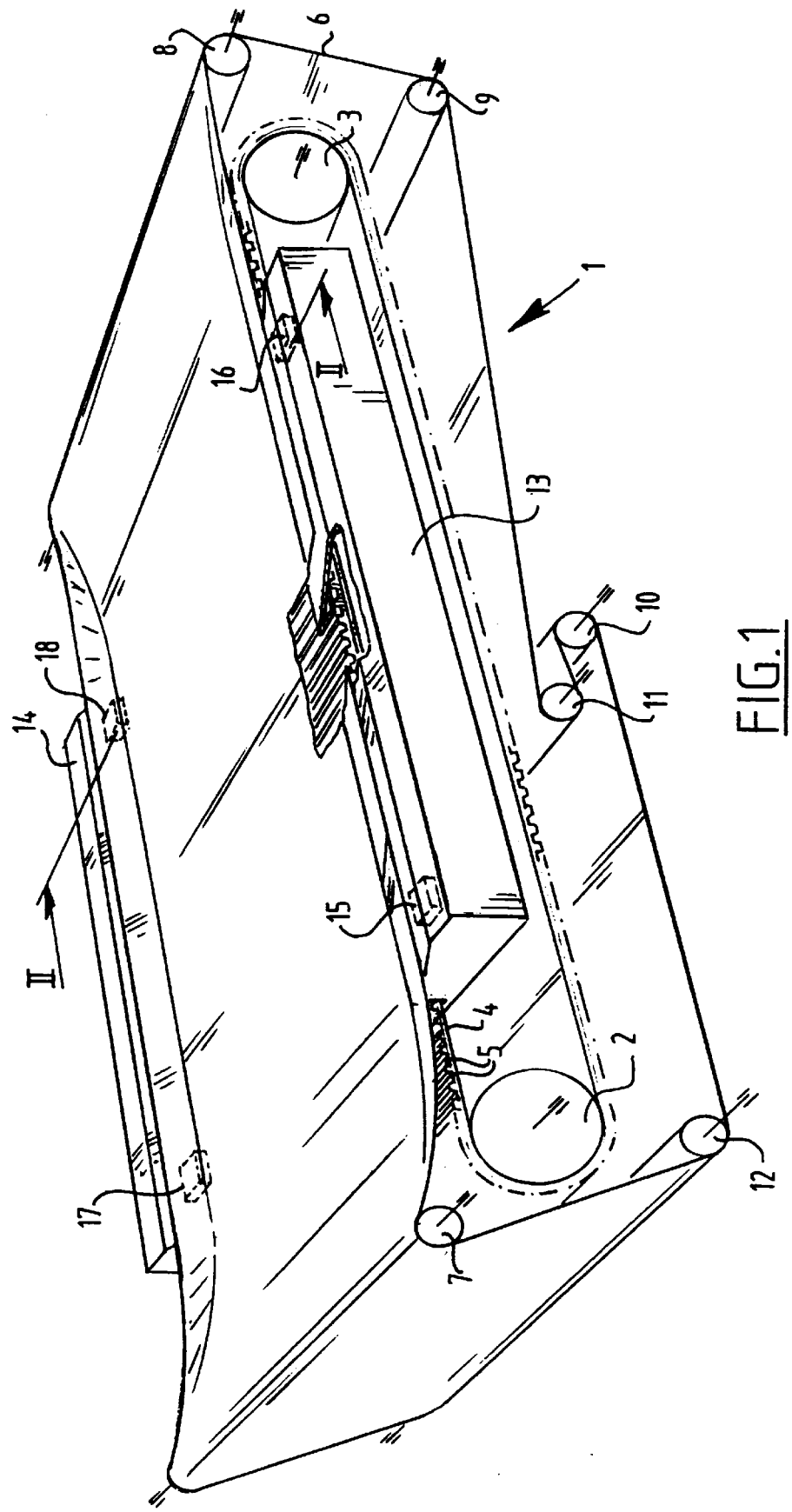

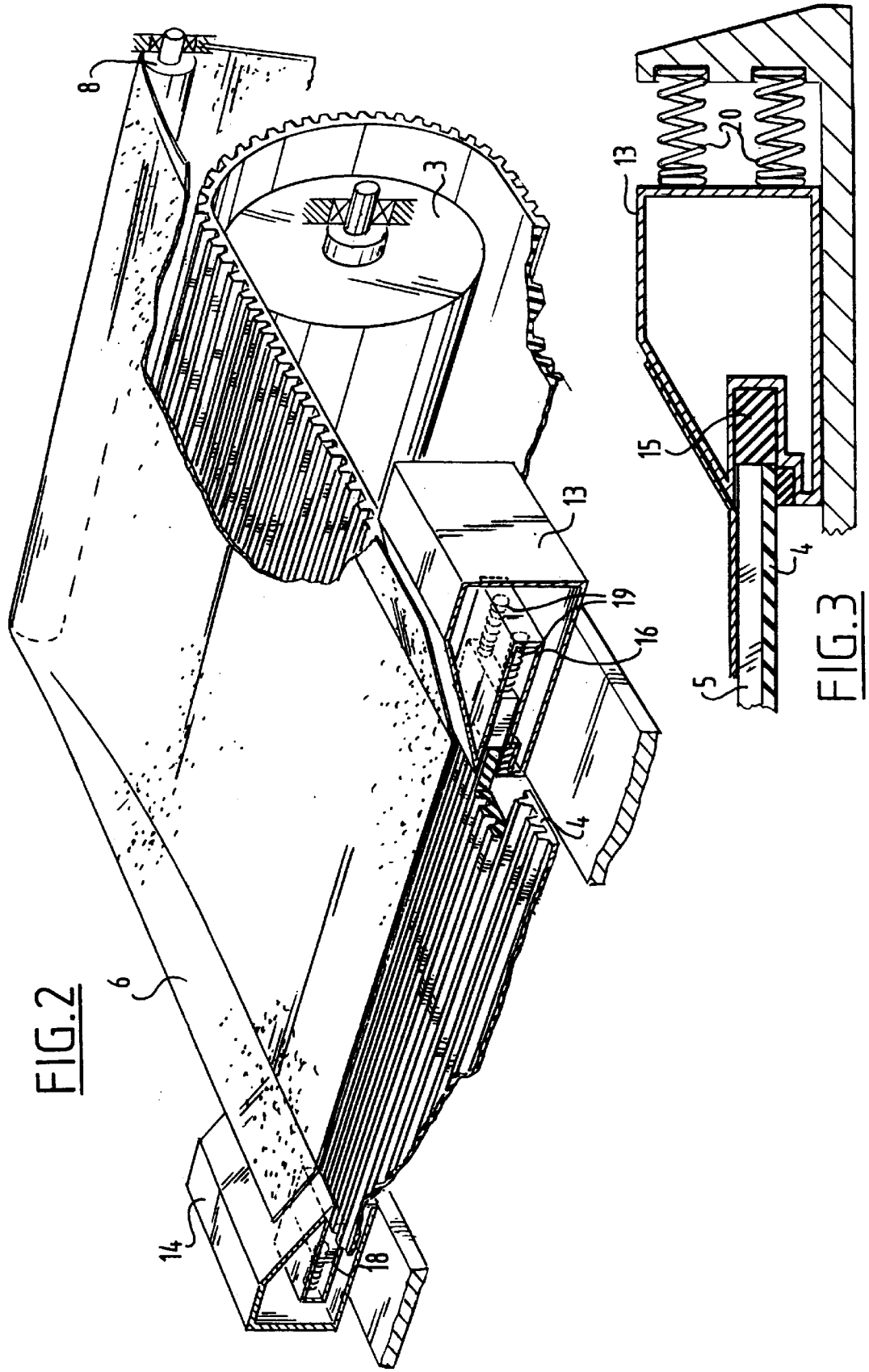

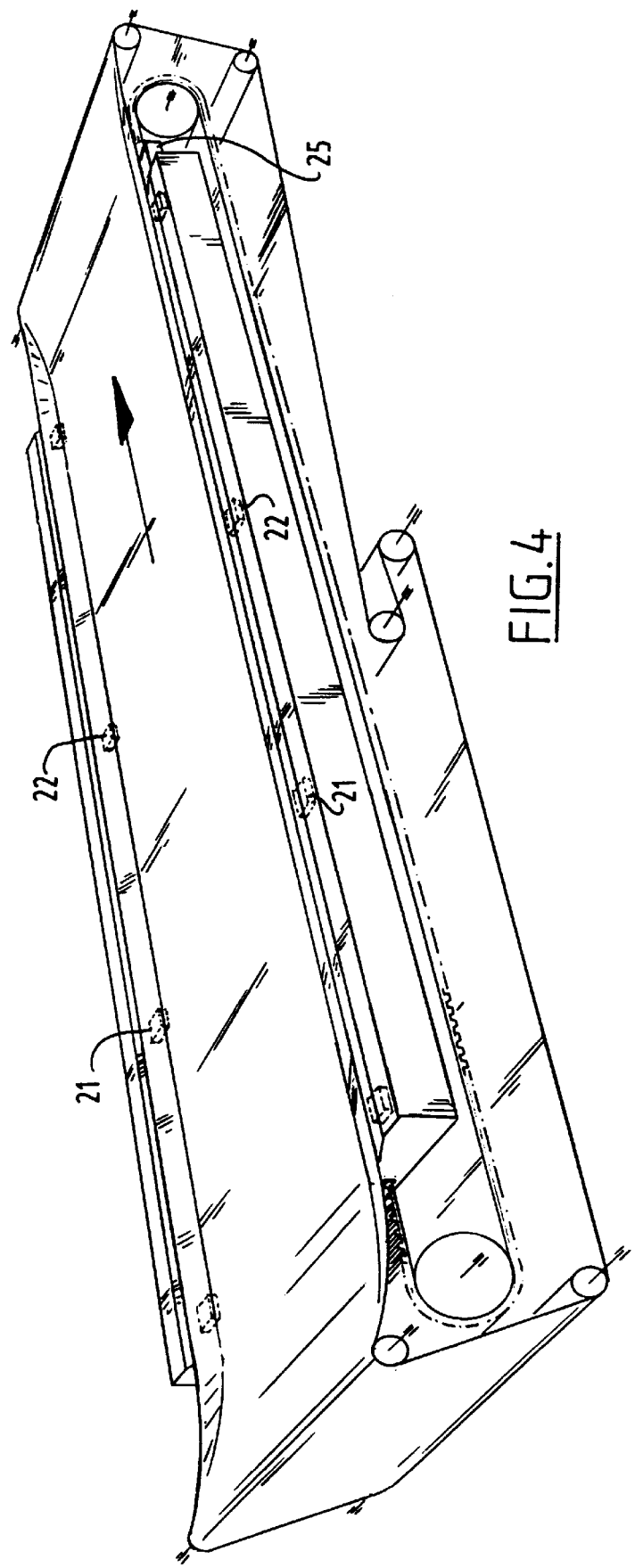

SEPARATING DEVICE

BACKGROUND OF THE INVENTION

The invention relates to a continuously-operating separating device for separating liquids and solids, comprising a carrier belt trained round guide rollers and provided with channels running in roughly a transverse direction, at least one drive roller, a filter belt supported by the carrier belt, with at least one suction box placed on the side of the carrier belt, wherein the carrier belt extends at the sides into a continuous slot in the side casing and the top surface and the bottom surface of the carrier belt are sealed relative to the edges of the continuous slot.

In a device known from Netherlands publication 8303016, sealing of the carrier belt relative to the laterally placed suction box is achieved by a specific sealing construction. Thus given as one solution is a flexible connection between an outer wall of the suction box and the side end face of the carrier belt. In this proposed solution the carrier belt is situated wholly outside the connecting slot in the suction box.

According to another solution a special design of the suction box is applied such that a part connects to the side end face of the carrier belt with interposing of a flexible seal and another part connects to the upper surface of a thickened portion of the carrier belt. Here also the carrier belt is situated outside the suction box.

Finally, yet another solution consists of causing the carrier belt to protrude a short distance into the suction box, wherein the top and bottom sides are then sealed relative to the wall of the suction box by flexible seals.

Such seals allow of only a very small variation in the position of the carrier belt relative to the suction box. Particularly in the case of larger separating devices such seals cannot be used because the dimensional variations in the width dimension of the carrier belt can be relatively large as seen in longitudinal direction. During separation of solids and liquids at high temperature there is, in addition, a temperature progression along the length of the carrier belt such that the expansion of the carrier belt is not everywhere the same. It is further not possible, particularly in the case of longer and wider belts, to carry the belts in one line over the rollers. Lateral shifts occur frequently in practice.

The invention has for its object to provide a solution to these problems.

SUMMARY OF THE INVENTION

This is achieved according to the invention in that the suction box is provided with a sealing member connecting onto the side edge of the carrier belt and that this sealing member is displaceable in roughly a lateral direction.

Because the sealing members are laterally displaceable as a whole, a relatively large variation from the ideal line of the carrier belt can be compensated. The function compensating for the variation of the carrier belt in width direction is therefore not achieved by the flexibility of the sealing member itself but because the sealing member itself is integrally displaceable. It is possible to embody the suction box for displacement with the sealing member connected thereto. It is also possible to arrange the sealing member displaceably relative to the suction box.

The arrangement of sealing members at mutual distances as seen in the lengthwise direction makes it possible to obtain a certain progression of the pressure in the suction box. This can be important for operational management.

According to another preferred embodiment an outlet for liquid and a separate outlet for gas are arranged on the suction box. Because the liquid, and therewith gas, flow through the transversely directed channels of the carrier belt debouching in the suction box, comparatively little turbulence occurs. A sufficient separation between gas and liquid can thereby already be achieved in the suction box such that the liquid can be transported to an outlet located at the bottom of the suction box while the gases move upward to an outlet intended for gas which is placed at the top of the suction box.

This prevents additional separators having to be used, which of course has a cost-saving effect. This favorable effect is enhanced even further by giving the suction boxes a cross-sectionally circular form, wherein the transversely directed channels in the carrier belt debouch roughly at the position of the middle of the suction box.

BRIEF DESCRIPTION OF THE DRAWINGS

The invention is further elucidated with reference to an embodiment in accordance with the annexed drawings.

In the drawings:

FIG. 1 shows a perspective view of a separating device according to the invention;

FIG. 2 shows in perspective view a section along the line II—II in FIG. 1;

FIG. 3 shows in sectional view the suction box according to FIG. 2;

FIG. 4 shows an embodiment wherein a plurality of seals are also arranged as seen in lengthwise direction.

DESCRIPTION OF THE PREFERRED EMBODIMENT

Figure 5:
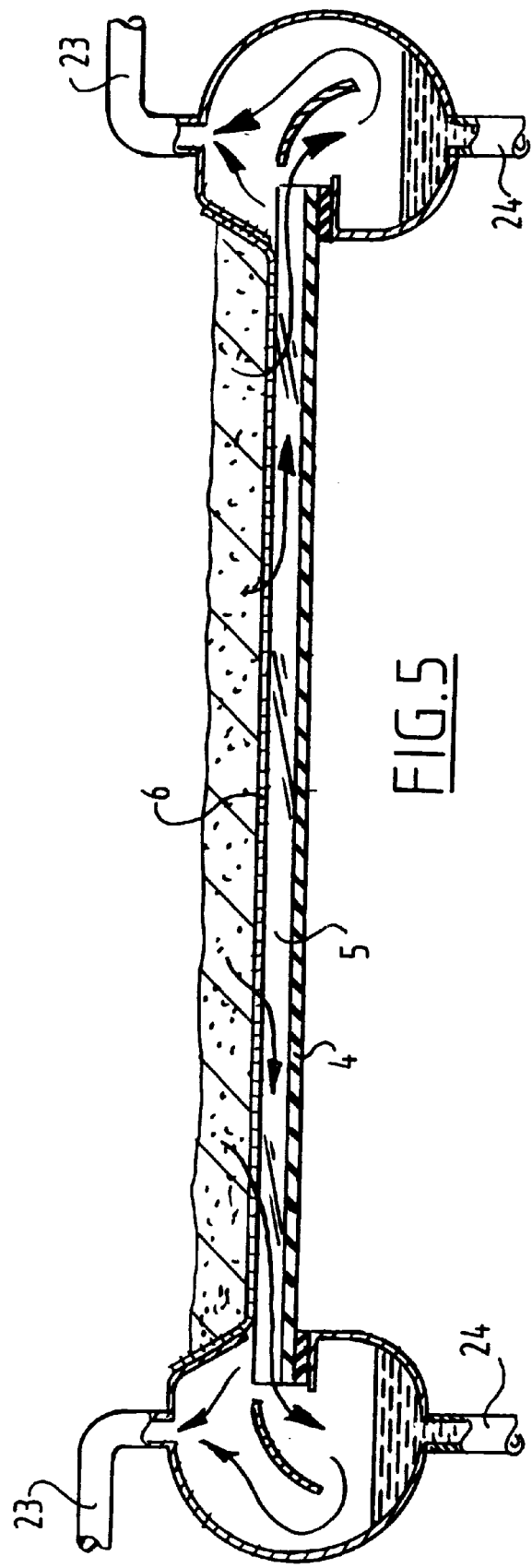
FIG. 5 shows a cross-section through the separating device according to the invention.

The separating device according to the invention 1 comprises a carrier belt 4 which is trained round guide rollers 2, 3 and which has transversely directed channels 5. One of the rollers 2 and 3 is driven. Carrier belt 4 carries a filter cloth 6 which is likewise trained round guide rollers 7, 8, 9, 10, 11 and 12. Suction boxes 13, 14 are placed on the sides of the separating installation. Placed at the beginning and end of the suction boxes are seals 15, 16 and 17, 18 which seal against the side edge of the carrier belt.

As is known, the mixture for separating is supplied during use to the upper part of the filter cloth and separation into liquid and solid takes place, wherein the liquid is drawn through channels 5 to the suction boxes 13 respectively 14.

According to the invention sealing against the side end face takes place with for instance a sealing member 15. As the carrier belt displaces in sideways direction the sealing member moves together with the carrier belt counter to the pressure of for instance springs 19. During a return movement the sealing member 15 follows the carrier belt as a result of the spring pressure.

It is also possible to arrange sealing member 15 fixedly in the suction box and to cause the suction box as a whole to follow the movements of the carrier belt counter to the pressure of for instance springs 20. Just as springs 19, these springs of course also provide the resetting force.

As the embodiment of FIG. 4 shows, it is possible to arrange additional seals 21, 22 for instance in longitudinal direction in order to enable maintaining of a determined desired pressure distribution inside the suction box.

In another preferred embodiment as according to FIG. 5, an outlet for gases 23 is arranged on the top in each of the suction boxes and a separate outlet 24 for liquid on the bottom. Because the liquid flows away via the channels in the carrier belt no turbulence occurs and a sufficient separation between gas and liquid already takes place in the suction boxes such that these can be discharged separately, thus rendering unnecessary further separating devices for gas and liquid.

Finally, it is noted that a lateral opening 25 can be present joining onto the suction box as seen in the transporting direction to enable discharge of the liquids still present in the transversely directed channels of the carrier belt.

I claim:

1. A continuously-operating separating device for separating liquids and solids, comprising a carrier belt trained round guide rollers and moving in a direction and provided with channels running in roughly a transverse direction, at least one drive roller, a filter belt supported by the carrier belt, with at least one suction box placed on the side of the carrier belt, wherein the carrier belt extends at the sides into a continuous slot in a side casing and the top surface and the bottom surface of the carrier belt are sealed relative to the edges of the continuous slot, wherein the suction box is provided with a sealing member for engaging a side edge of the carrier belt and for sealing the suction box and this sealing member is displaceably mounted to move in a lateral direction when the carrier belt moves in a lateral direction.

2. The continuously-operating separating device as claimed in claim 1, wherein the sealing member is displaceably mounted relative to the suction box.

3. The continuously-operating separating device as claimed in claim 1, wherein the sealing member is arranged fixedly in the suction box and the suction box is laterally displaceable.

4. The continuously-operating separating device as claimed in claim 1, further comprised of a plurality of sealing members and wherein the sealing members are arranged at mutual distances along the length of the carrier belt.

5. The continuously-operating separating device as claimed in claim 1, further including an outlet for gas and a discharge for liquid arranged in the suction box.

6. The continuously-operating separating device as claimed in claim 1, wherein the carrier belt has transversely directed channels and a lateral opening is joined to the suction box to enable discharge of the liquids present in the transversely directed channels of the carrier belt.

7. The continuously-operating separating device as claimed in claim 2, further including an outlet for gas and a discharge for liquid are arranged in the suction box.

8. The continuously-operating separating device as claimed in claim 3, further including an outlet for gas and a discharge for liquid are arranged in the suction box.

9. The continuously-operating separating device as claimed in claim 4, further including an outlet for gas and a discharge for liquid are arranged in the suction box.

10. The continuously-operating separating device as claimed in claim 2, wherein the carrier belt has transversely directed channels and a lateral opening connecting is joined to the suction box to enable discharge of the liquids present in the transversely directed channels of the carrier belt.

11. The continuously-operating separating device as claimed in claim 3, wherein the carrier belt has transversely directed channels and a lateral opening connecting is joined to the suction box to enable discharge of the liquids present in the transversely directed channels of the carrier belt.

12. The continuously-operating separating device as claimed in claim 4, wherein the carrier belt has transversely directed channels and a lateral opening connecting is joined to the suction box to enable discharge of the liquids present in the transversely directed channels of the carrier belt.

* * * * *